(12) United States Patent
Hirota et al.

(10) Patent No.: US 11,071,961 B2
(45) Date of Patent: Jul. 27, 2021

(54) FLUIDIZED BED REACTION CONTAINER AND METHOD FOR PRODUCING TRICHLOROSILANE

(71) Applicant: TOKUYAMA CORPORATION, Yamaguchi (JP)

(72) Inventors: Kenji Hirota, Yamaguchi (JP); Katsuya Ogihara, Yamaguchi (JP)

(73) Assignee: TOKUYAMA CORPORATION, Yamayuchi (JP)

( * ) Notice: Subject to any disclaimer, the term of this patent is extended or adjusted under 35 U.S.C. 154(b) by 0 days.

(21) Appl. No.: 16/765,074

(22) PCT Filed: Nov. 16, 2018

(86) PCT No.: PCT/JP2018/042554
§ 371 (c)(1),
(2) Date: May 18, 2020

(87) PCT Pub. No.: WO2019/098342
PCT Pub. Date: May 23, 2019

(65) Prior Publication Data
US 2020/0353435 A1 Nov. 12, 2020

(30) Foreign Application Priority Data

Nov. 20, 2017 (JP) .............................. JP2017-223136

(51) Int. Cl.
*B01J 8/44* (2006.01)
*B01J 8/24* (2006.01)
(Continued)

(52) U.S. Cl.
CPC . *B01J 8/44* (2013.01); *B01J 8/24* (2013.01); *B01J 8/32* (2013.01); *C01B 33/107* (2013.01)

(58) Field of Classification Search
CPC ......... B01J 8/44; B01J 8/32; B01J 8/24; B01J 8/1818; B01J 8/1827; C01B 33/107
See application file for complete search history.

(56) References Cited

U.S. PATENT DOCUMENTS

| 5,776,416 A | 7/1998 | Oda |
| 2009/0104104 A1 | 4/2009 | Inaba |

(Continued)

FOREIGN PATENT DOCUMENTS

| CN | 201240855 | 5/2009 |
| CN | 101486466 | 7/2009 |

(Continued)

OTHER PUBLICATIONS

International Preliminary Report on Patentability for PCT/JP2018/042554, dated May 26, 2020, 7 pages.

(Continued)

*Primary Examiner* — Lessanework Seifu
(74) *Attorney, Agent, or Firm* — Casimir Jones, SC; Robert A. Goetz (57) ABSTRACT

To provide a fluidized-bed reaction vessel and a trichlorosilane production method each of which can reduce corrosion and wear of a reaction container inner wall, a fluidized-bed reaction vessel causes metallurgical grade silicon powder and hydrogen chloride gas to react with each other for production of trichlorosilane. The fluidized-bed reaction vessel includes a plurality of ejection nozzles (20) standing on a distributor plate (11) as a bottom surface of a container body. The ejection nozzles (20) each have a gas ejection opening (22a) configured to allow hydrogen chloride gas to be ejected sideways. The plurality of ejection nozzles (20) include a first ejection nozzle (20a) adjacent to an outer wall (10a) of the container body, the first ejection nozzle (20a) having a gas ejection opening (22a) in such a pattern as to (Continued)

prevent hydrogen chloride gas from being ejected toward the outer wall (10*a*).

6 Claims, 5 Drawing Sheets

(51) Int. Cl.
*C01B 33/107* (2006.01)
*B01J 8/32* (2006.01)

(56) References Cited

U.S. PATENT DOCUMENTS

| | | |
|---|---|---|
| 2009/0108100 A1 | 4/2009 | Inaba |
| 2010/0074823 A1 | 3/2010 | Inaba |
| 2010/0183496 A1 | 7/2010 | Narukawa |
| 2011/0158884 A1 | 6/2011 | Bentley |
| 2012/0164053 A1 | 6/2012 | Narukawa |
| 2012/0269686 A1 | 10/2012 | Jung |
| 2013/0272946 A1 | 10/2013 | Inaba |
| 2016/0152482 A1 | 6/2016 | Nettles et al. |

FOREIGN PATENT DOCUMENTS

| | | |
|---|---|---|
| CN | 201361547 | 12/2009 |
| CN | 201362599 | 12/2009 |
| CN | 201643908 | 11/2010 |
| CN | 201882919 | 6/2011 |
| CN | 203922739 | 11/2014 |
| CN | 104211069 | 12/2014 |
| CN | 204999622 | 1/2016 |
| EP | 2210661 | 7/2010 |
| JP | 09-169514 | 6/1997 |
| JP | 9-194207 | 7/1997 |
| JP | 2009-120467 | 6/2009 |
| JP | 2009-120468 | 6/2009 |
| JP | 2010-189256 | 9/2010 |
| JP | 2011-184242 | 9/2011 |
| JP | 2012-223751 | 11/2012 |

OTHER PUBLICATIONS

International Search Report for PCT/JP2018/042554, dated Feb. 5, 2019, 1 page.
The Extended European Search Report for EP Patent Application No. 18879726.0, dated May 3, 2021, 7 pages.

FLUIDIZED BED REACTION CONTAINER AND METHOD FOR PRODUCING TRICHLOROSILANE

TECHNICAL FIELD

The present invention relates to (i) a fluidized-bed reaction vessel including a plurality of ejection nozzles and (ii) a method for producing trichlorosilane.

BACKGROUND ART

Figure 4:
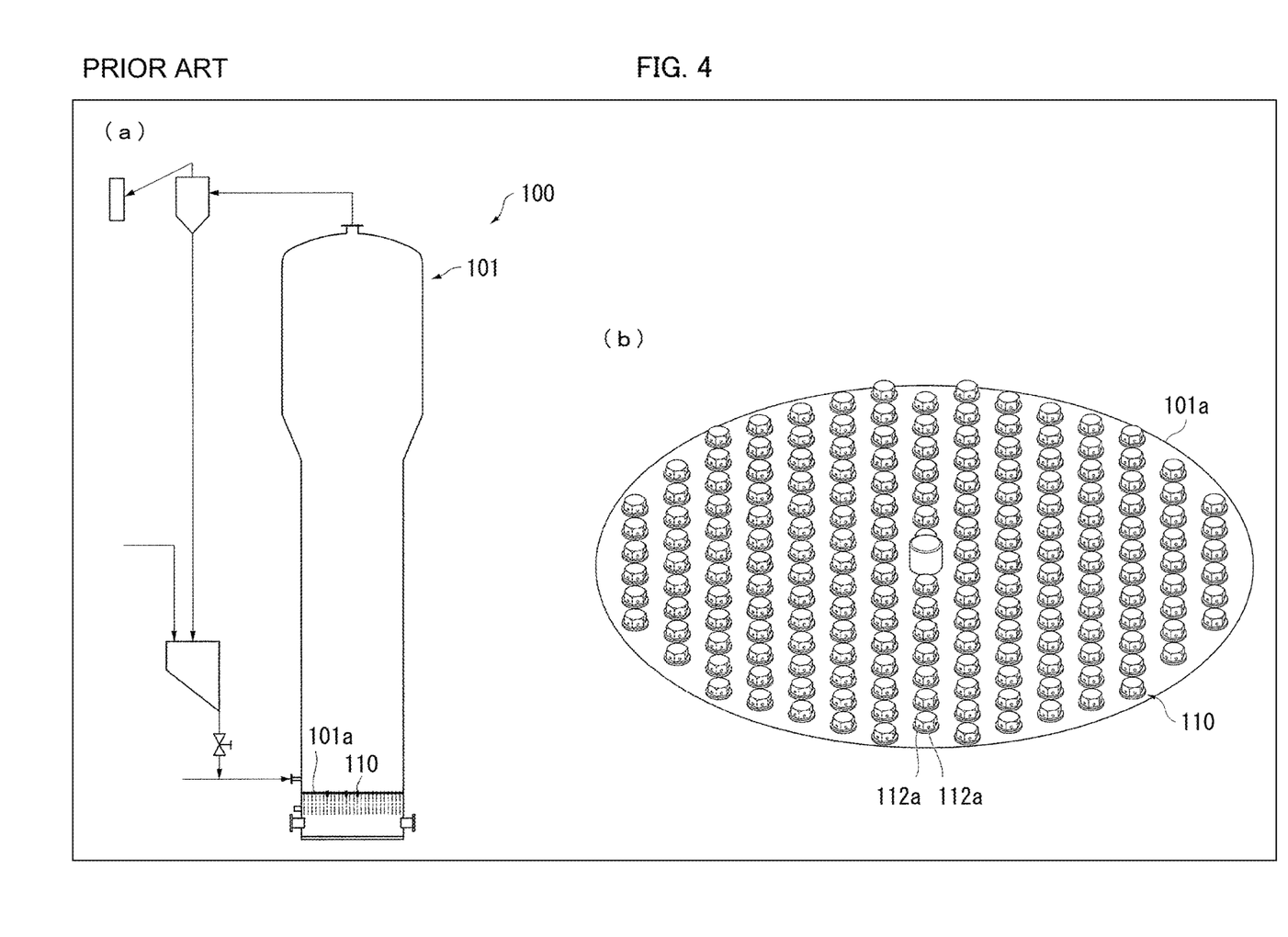
Figure 5:
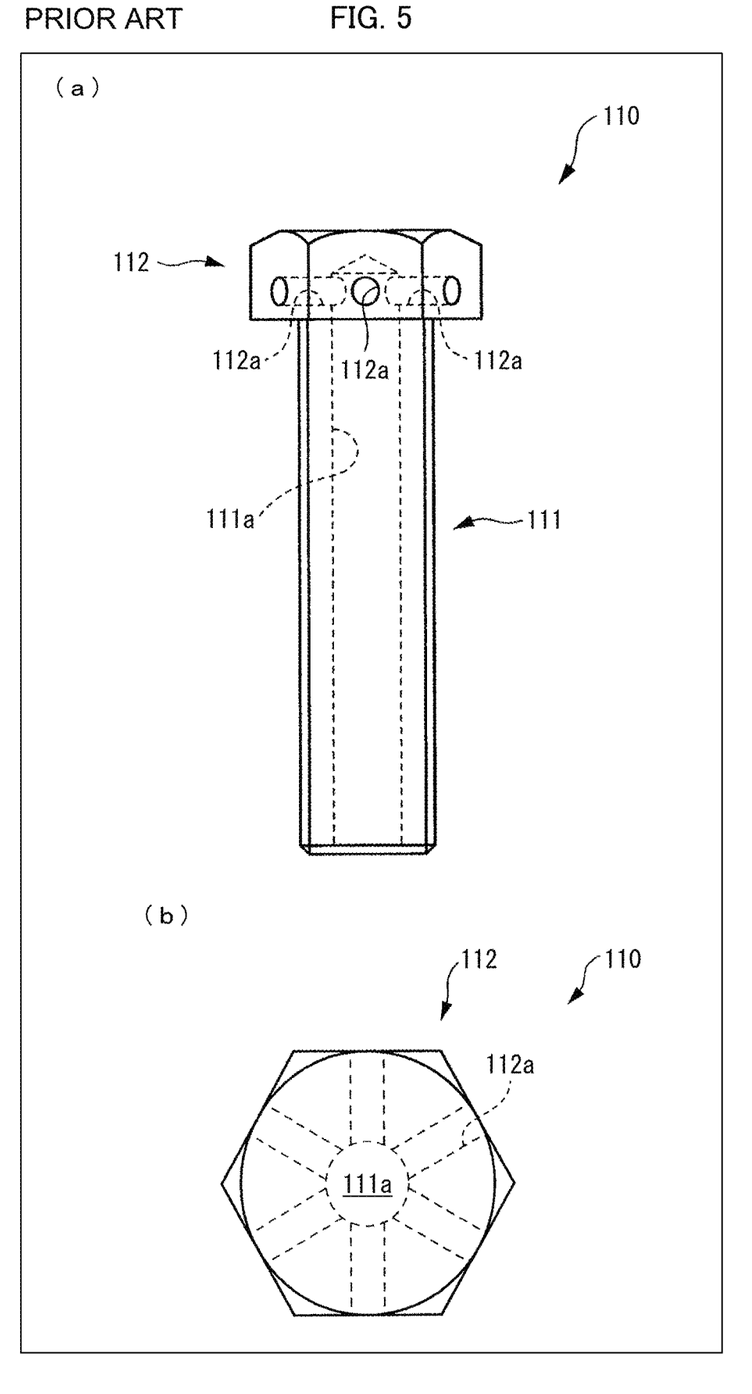

Patent Literature 1, for example, discloses a reaction device configured for trichlorosilane production to cause metallurgical grade silicon powder (Si) and hydrogen chloride gas (HCl) to react with each other to produce trichlorosilane ($SiHCl_3$). The reaction device 100 configured for trichlorosilane production includes a fluidized-bed reaction vessel. As illustrated in (a) of FIG. 4, the reaction device 100 includes (i) a device body 101 into which metal silicon powder is supplied and (ii) a plurality of hydrogen chloride gas ejection members 110 configured to introduce hydrogen chloride gas into a bottom section 101a of the device body 101 and eject the hydrogen chloride gas. The hydrogen chloride gas ejection members 110, as illustrated in (a) and (b) of FIG. 5, each include (i) a shaft section 111 extending in the longitudinal direction and (ii) a head section 112 that extends in a direction crossing the longitudinal direction of the shaft section 111 and that has a hexagonal planar shape. The shaft section 111 has a gas supply hole 111a inside. The gas supply hole 111a communicates at the head section 112 with ejection holes 112a radially extending in six directions. The ejection holes 112a are exposed at an outer surface of the head section 112.

The above structure allows each of the hydrogen chloride gas ejection members 110 to eject hydrogen chloride gas through the gas supply hole 111a and the ejection holes 112a into the device body 101.

CITATION LIST

Patent Literature

[Patent Literature 1]
Japanese Patent Application Publication, Tokukai, No. 2009-120468 (Publication date: Jun. 6, 2009)

SUMMARY OF INVENTION

Technical Problem

The above conventional reaction device 100 for trichlorosilane production is configured such that the hydrogen chloride gas ejection members 110 stand on the bottom section 101a of the device body 101 as illustrated in (b) of FIG. 4. This means that each of the hydrogen chloride gas ejection members 110 ejects hydrogen chloride gas laterally and radially.

Thus, outer ones of the hydrogen chloride gas ejection members 110 eject hydrogen chloride gas toward the side wall of the device body 101. This may corrode or wear the side wall of the device body 101.

An aspect of the present invention has been accomplished in view of the above conventional issue, and has an object to provide a fluidized-bed reaction vessel and a trichlorosilane production method each of which can reduce corrosion or wear of a reaction container inner wall.

Solution to Problem

A fluidized-bed reaction vessel as an aspect of the present invention is, in order to attain the above object, a fluidized-bed reaction vessel configured to cause metallurgical grade silicon powder and hydrogen chloride gas to react with each other for production of trichlorosilane, the fluidized-bed reaction vessel including: a container body having a bottom surface; and a plurality of ejection nozzles standing on the bottom surface, the ejection nozzles each having at least one gas ejection opening configured to allow the hydrogen chloride gas to be ejected sideways, the plurality of ejection nozzles including at least one first ejection nozzle adjacent to an outer wall of the container body, the at least one gas ejection opening of the at least one first ejection nozzle being configured to prevent the hydrogen chloride gas to be ejected toward the outer wall.

A method as an aspect of the present invention for producing trichlorosilane, in order to attain the above object, includes causing metallurgical grade silicon powder and hydrogen chloride gas to react with each other with use of the fluidized-bed reaction vessel.

Advantageous Effects of Invention

An aspect of the present invention advantageously provides a fluidized-bed reaction vessel and a trichlorosilane production method each of which can reduce corrosion or wear of a reaction container inner wall.

BRIEF DESCRIPTION OF DRAWINGS (a) of FIG. 1 is a plan view of a plurality of ejection nozzles standing on a bottom surface of a fluidized-bed reaction vessel as an embodiment of the present invention. (b) of FIG. 1 is a cross-sectional view of a first ejection nozzle adjacent to an outer wall of a container body, illustrating respective directions that gas ejection openings face. (c) of FIG. 1 is a cross-sectional view of a second ejection nozzle present inward of the first ejection nozzle, illustrating respective directions that gas ejection openings face.

(a) of FIG. 3 is a cross-sectional view of an ejection nozzle, illustrating the configuration thereof. (b) of FIG. 3 is a cross-sectional view of a main part of an ejection nozzle, illustrating the configuration thereof.

(a) of FIG. 4 is a cross-sectional view of a conventional fluidized-bed reaction vessel, illustrating the overall configuration thereof. (b) of FIG. 4 is a perspective view of ejection nozzles of the conventional fluidized-bed reaction vessel, illustrating how the ejection nozzles are arranged.

(a) of FIG. 5 is an elevational view of a conventional ejection nozzle, illustrating the configuration thereof. (b) of FIG. 5 is a plan view of the conventional ejection nozzle, illustrating the configuration thereof.

DESCRIPTION OF EMBODIMENTS

The description below deals with an embodiment of the present invention with reference to FIGS. 1 to 3.

The present embodiment is a fluidized-bed reaction vessel 1 for use as a reaction vessel for producing trichlorosilane (SiHCl$_3$). Trichlorosilane is a raw material of high-purity polycrystal silicon, and is produced industrially by causing metallurgical grade silicon powder (Si) and hydrogen chloride gas (HCl) to react with each other.

(Configuration of Fluidized-Bed Reaction Vessel)

Figure 2:
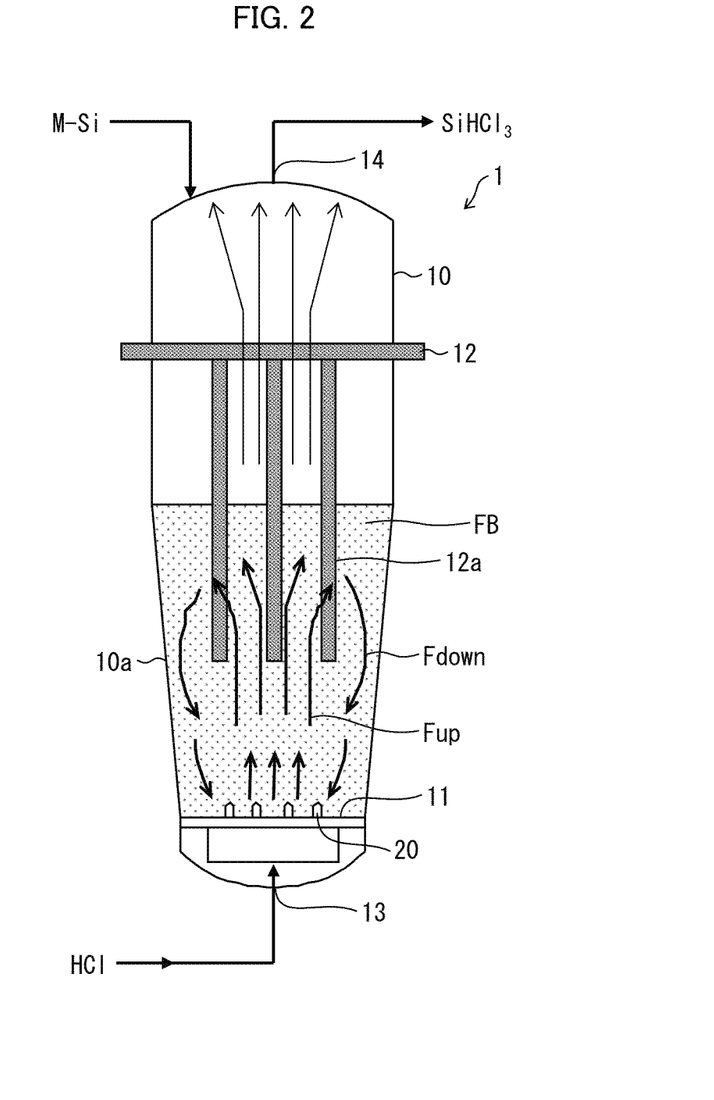
FIG. 2 is a cross-sectional view of the fluidized-bed reaction vessel, illustrating the overall configuration thereof.

With reference to FIG. 2, the description below deals with how the fluidized-bed reaction vessel 1 as the present embodiment is configured. FIG. 2 is a cross-sectional view of the fluidized-bed reaction vessel 1 as the present embodiment, illustrating the configuration thereof.

The fluidized-bed reaction vessel 1 as the present embodiment is, as illustrated in FIG. 2, configured to, while fluidizing metallurgical grade silicon powder with use of hydrogen chloride gas, cause the metallurgical grade silicon powder and the hydrogen chloride gas to react with each other at a temperature within a range of 200° C. to 500° C. for production of trichlorosilane. The fluidized-bed reaction vessel 1 includes a container body 10, a distributor plate 11, and a heat transfer medium pipe 12.

The fluidized-bed reaction vessel 1 is configured such that metallurgical grade silicon powder is supplied from above the container body 10, while hydrogen chloride gas is supplied through a gas feed opening 13 in a bottom section of the container body 10 into the container body 10.

The distributor plate 11 is disposed above the gas feed opening 13 of the container body 10. The distributor plate 11 has an upper surface on which a plurality of ejection nozzles 20 stand. The ejection nozzles 20 are configured to allow hydrogen chloride gas to be distributed inside the container body 10.

The fluidized-bed reaction vessel 1 is configured to fluidize metallurgical grade silicon powder inside the container body 10 with use of hydrogen chloride gas to cause the metallurgical grade silicon powder and the hydrogen chloride gas to react with each other. FIG. 2 shows a hatched area to indicate a fluidized bed FB of metallurgical grade silicon powder. The reaction between metallurgical grade silicon powder and hydrogen chloride gas produces trichlorosilane, which is then taken out from an outlet 14 at an upper portion of the container body 10. Reaction of metallurgical grade silicon powder starts at the surface thereof, and thus gradually reduces the particle diameter. When the particles have become approximately 30 μm or smaller, the metallurgical grade silicon powder is scattered from the outlet 14 at an upper portion of the container body 10. Impurities accumulate at the bottom section of the container body 10, and are removed regularly.

Reaction between metallurgical grade silicon powder and hydrogen chloride gas for production of trichlorosilane is an exothermic reaction. The temperature inside the container body 10 thus increases as the reaction proceeds. In view of that, the fluidized-bed reaction vessel 1 includes a heat transfer medium pipe 12 for controlling the temperature inside the container body 10. The heat transfer medium pipe 12 includes a plurality of vertical pipes 12a extending in an up-down direction inside the container body 10. The vertical pipes 12a allow a heat transfer medium to be circulated therethrough. This allows exchange of heat between (i) the reaction between metallurgical grade silicon powder and hydrogen chloride gas and (ii) the heat transfer medium through the heat transfer medium pipe 12. The above configuration thereby allows (i) heat of reaction between metallurgical grade silicon powder and hydrogen chloride gas to be removed and (ii) the temperature inside the container body 10 to be kept at a predetermined temperature.

The container body 10 for the present embodiment preferably has an outer wall 10a having an inclined portion, that is, a portion having an inner diameter that becomes smaller in a direction from a central portion to a lower portion as illustrated in FIG. 2. The container body 10, in other words, preferably has an inclined portion corresponding to the fluidized bed FB. The inclined outer wall forms an angle of, for example, not less than 3.0° and not more than 7.0° with the central axis of the container body 10. This ensures a space for a downflow Fdown of hydrogen chloride gas other than an upflow Fup thereof, and thereby allows for smooth fluidity of the fluidized bed FB for efficient circulation.

The outer wall 10a may be inclined such that the inclined portion, whose cross section perpendicular to the height direction of the container body 10 increases in area in the upward direction, occupies at least 80% of the distance from the gas feed opening 13 to the top surface of the fluidized bed FB. The outer wall 10a may be inclined such that the inclined portion starts at the boundary between the fluidized bed FB and the distributor plate 11. The outer wall 10a may alternatively be inclined such that the inclined portion extends along the entire height from the gas feed opening 13 to the top surface of the fluidized bed FB.

Note that flows of the metal silicon powder and the hydrogen chloride gas to the fluidized-bed reaction vessel 1 are not described here, since descriptions thereof are provided in, for example, Japanese Patent Application Publication, Tokukai, No. 2011-184242. Note that a flow of trichlorosilane which has been taken out of the fluidized-bed reaction vessel 1 is not described here, since, descriptions thereof are provided in, for example, Japanese Patent Application Publication, Tokukai, No. 2015-089859.

(Configuration of Ejection Nozzle)

As illustrated in FIG. 2 (which is referred to above), the container body 10 contains, at a lower portion thereof, a distributor plate 11 to serve as a bottom surface. The distributor plate 11 supports a plurality of ejection nozzles standing thereon and configured to eject hydrogen chloride gas. The ejection nozzles 20 each normally have a diameter within a range of 20 mm to 50 mm.

With reference to (a) and (b) of FIG. 3, the description below deals with how the ejection nozzles 20 are configured. (a) of FIG. 3 is a cross-sectional view of an ejection nozzle 20, illustrating the configuration thereof. (b) of FIG. 3 is a cross-sectional view of a main part of an ejection nozzle 20, illustrating the configuration thereof.

Figure 3:
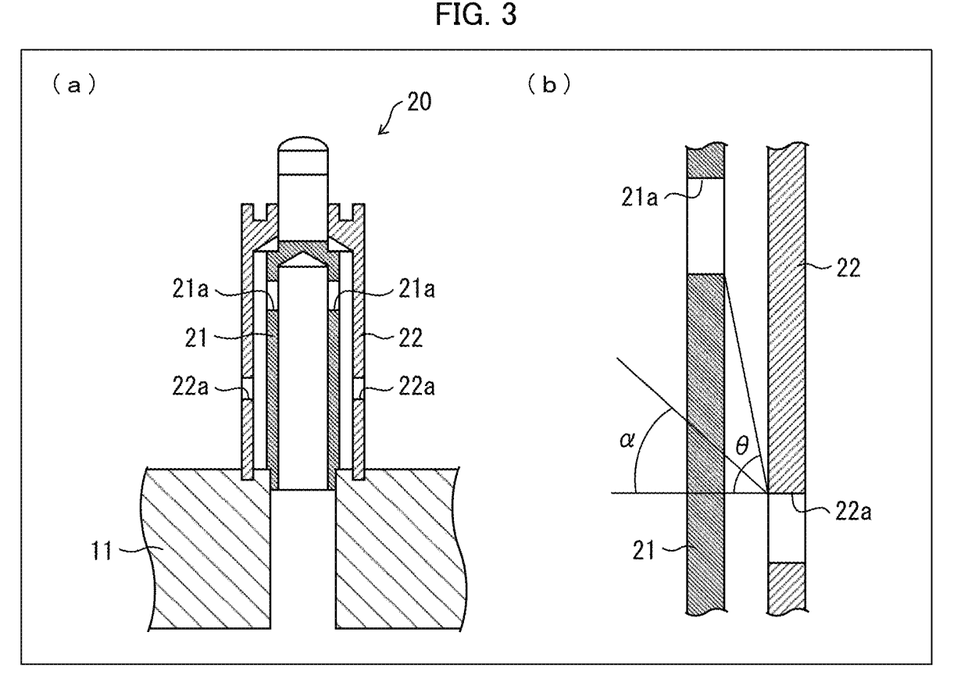

The ejection nozzles 20 for the present embodiment each have a double-pipe structure including an inner pipe 21 and an upper-surface blocked outer pipe 22 as illustrated in (a) of FIG. 3. The inner pipe 21 has inner-pipe openings 21a through which hydrogen chloride gas is ejected into a space between the upper-surface blocked outer pipe 22 and the inner pipe 21. The upper-surface blocked outer pipe 22 has, at a portion lower than the inner-pipe openings 21a, gas ejection openings 22a through which hydrogen chloride gas is ejected in the container body 10. The gas ejection openings 22a may each have any diameter. The diameter is, however, normally within a range of 2.0 mm to 5.0 mm, preferably 3.0 mm to 4.0 mm, in order to eject a sufficient amount of hydrogen chloride gas and sufficiently produce the effect of preventing the gas ejection openings 22a from becoming clogged by metallurgical grade silicon powder. The inner-pipe openings 21a each normally have a diameter within a range of 4 mm to 15 mm, preferably 6 mm to 13 mm.

The upper-surface blocked outer pipe 22 has a blocked upper surface in order to allow hydrogen chloride gas to be ejected through only the gas ejection openings 22a. The inner pipe 21 for the present embodiment has a blocked upper surface in order to allow hydrogen chloride gas (HCl) to be ejected through only the inner-pipe openings 21a. The present invention is, however, not limited to such a configuration. The inner pipe 21 for an embodiment may have an unblocked upper surface.

The ejection nozzles 20 each having a double-pipe structure allows for the advantage below. A single-piped ejection nozzle may let metallurgical grade silicon powder enter the ejection nozzle directly. This may clog the ejection nozzle itself.

In contrast, the present embodiment is arranged such that the ejection nozzles 20 each have a double-pipe structure including an upper-surface blocked outer pipe 22 and an inner pipe 21 and that the upper-surface blocked outer pipe 22 has gas ejection openings 22a lower in position than the inner-pipe openings 21a. Thus, even in a case where metallurgical grade silicon powder has entered an ejection nozzle 20 through a gas ejection opening 22a of the upper-surface blocked outer pipe 22, the metallurgical grade silicon powder will be accumulated between the upper-surface blocked outer pipe 22 and the inner pipe 21, and will not likely enter the inner pipe 21. The ejection nozzles 20 for the present embodiment are thus configured such that metallurgical grade silicon powder does not likely enter the main channel of an ejection nozzle 20 to clog the ejection nozzle 20.

The ejection nozzles 20 for the present embodiment are particularly configured such that an angle θ is formed by (i) a straight line connecting the lower end of each inner-pipe opening 21a of each inner pipe 21 with the upper end of the corresponding gas ejection opening 22a of the corresponding upper-surface blocked outer pipe 22 and (ii) the horizontal line, the angle θ being larger than the repose angle α of accumulated metallurgical grade silicon powder as illustrated in (b) of FIG. 3. The repose angle refers to the steepest angle of a descent of metallurgical grade silicon powder at which piled metallurgical grade silicon powder will not slump spontaneously and will be stable.

With the above configuration, even in a case where metallurgical grade silicon powder is accumulated between the upper-surface blocked outer pipe 22 and the inner pipe 21, piled metallurgical grade silicon powder will not be taller than the inner-pipe openings 21a, indicating that metallurgical grade silicon powder will not likely enter the ejection nozzle 20 through an inner-pipe opening 21a. The above configuration can thereby prevent the ejection nozzles 20 from becoming clogged.

The upper-surface blocked outer pipe 22 for the present embodiment has gas ejection openings 22a at a position that is, for example, 20 mm above the upper surface of the distributor plate 11 as illustrated in (a) of FIG. 3.

Metallurgical grade silicon powder and hydrogen chloride gas are caused to react with each other for production of trichlorosilane during a reaction step. The reaction step leaves, for example, metal impurities such as aluminum (Al), calcium (Ca), and iron (Fe) accumulated on the distributor plate 11 in the container body 10 together with unreacted metallurgical grade silicon powder. This accumulation is removed regularly so that the metal impurities have a concentration kept at, for example, not more than 15% by weight.

The ejection nozzles 20 need to be each configured such that the gas ejection openings 22a of each ejection nozzle 20 are not clogged by impurities before the regular removal.

In view of the above, the fluidized-bed reaction vessel 1 as the present embodiment includes ejection nozzles 20 each having gas ejection openings 22a at a height that is, for example, 20 mm above the upper surface of the distributor plate 11 as described above. The height of the gas ejection openings 22a of an ejection nozzle 20 refers to the distance from the upper surface of the distributor plate 11 to the lower end of each of the gas ejection openings 22a.

The height of the gas ejection openings 22a from the upper surface of the distributor plate 11 is not necessarily 20 mm. The ejection nozzles 20 each preferably have gas ejection openings 22a at a height that is, for example, not less than 15 mm and not more than 30 mm from the upper surface of the distributor plate 11. This can prevent the gas ejection openings 22a of the ejection nozzles 20 from becoming clogged by impurities.

If the ejection nozzles 20 each have gas ejection openings 22a at a height that is less than 15 mm above the upper surface of the distributor plate 11 in the container body 10, impurities need to be removed frequently. If the ejection nozzles 20 each have gas ejection openings 22a at a height that is more than 30 mm above the upper surface of the distributor plate 11 in the container body 10, impurities may be removed less frequently, but since impurities are deposited to be tall, the impurities may become hardened and require a lot of effort for removal. Further, since the ejection nozzles 20 each have gas ejection openings 22a at a high position in the above case, there will be a higher possibility that it is impossible to cause an upflow of metallurgical grade silicon powder present below the gas ejection openings 22a of the ejection nozzle 20. This will lead to a decrease in the effective reaction field and to a decrease in the reaction efficiency as a result.

(How the Ejection Nozzles are Arranged and Where the Gas Ejection Openings are Present)

With reference to (a) and (b) of FIG. 1, the description below deals with how the ejection nozzles 20 for the present embodiment are arranged and where the gas ejection openings are present. (a) of FIG. 1 is a plan view of a plurality of ejection nozzles 20 standing on the distributor plate 11 of the fluidized-bed reaction vessel 1 as the present embodiment. (b) of FIG. 1 is a cross-sectional view of a first ejection nozzle 20a adjacent to the outer wall 10a of the container body 10, illustrating respective directions that the gas ejection openings 22a face. (c) of FIG. 1 is a cross-sectional view of a second ejection nozzle 20b present inward of the first ejection nozzle 20a, illustrating respective directions that the gas ejection openings 22a face.

Figure 1:
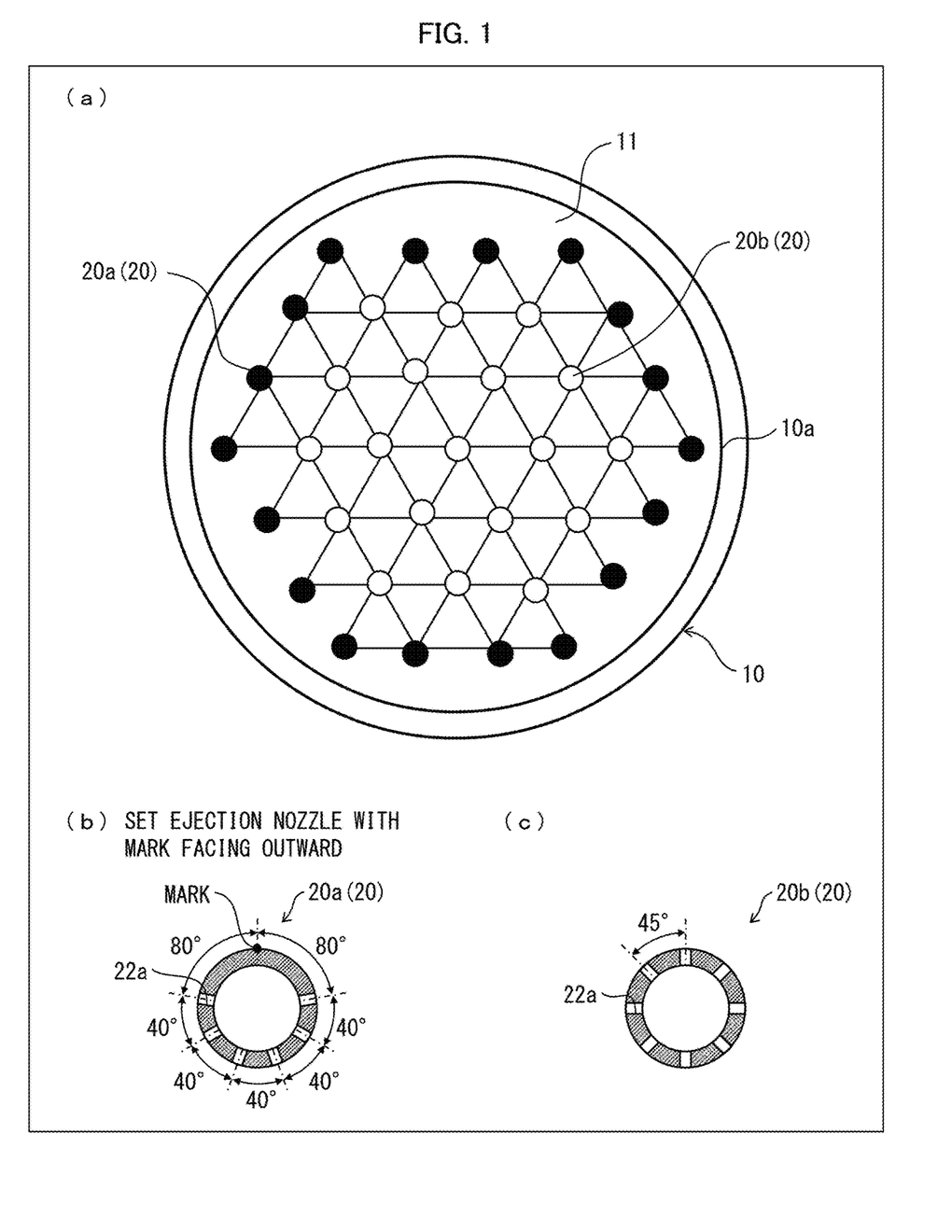

As illustrated in (a) of FIG. 1, the fluidized-bed reaction vessel 1 as the present embodiment includes a distributor plate 11 that supports a plurality of ejection nozzles 20 standing thereon in a lattice-like pattern. The plurality of ejection nozzles 20 for the present embodiment are roughly classified into (i) first ejection nozzles 20a adjacent to the outer wall 10a of the container body 10 and (ii) second ejection nozzles 20b present inward of the first ejection nozzles 20a.

For an aspect of the present invention, nozzles adjacent to the outer wall 10a are those among the plurality of ejection nozzles 20 standing on the bottom surface of the container body 10 which satisfy the following two positional conditions: First, a nozzle adjacent to the outer wall 10a has a central-axis portion outward of 67% (suitably 75%) from the center of the distributor plate 11 toward the outer wall in the radial direction of the distributor plate 11. Second, a nozzle adjacent to the outer wall 10a has a nozzle outer end (which faces the outer wall 10a) such that no other ejection nozzle is present in an area located on the outer-wall side of the nozzle which area is defined by straight lines each connecting the nozzle outer end with the outer wall 10a over the shortest distance.

The present embodiment preferably includes a plurality of first ejection nozzles 20a and a plurality of second ejection nozzles 20b surrounded by the plurality of first ejection nozzles 20a. Further, it is also preferable that 15% to 45% of the nozzles on the distributor plate 11 are first ejection nozzles 20a.

The first ejection nozzles 20a and the second ejection nozzles 20b differ from each other in terms of what directions the gas ejection openings 22a face.

Specifically, the first ejection nozzles 20a for the present embodiment each have gas ejection openings 22a each at such a position as to prevent hydrogen chloride gas from being ejected toward the gas ejection openings 22a. More specifically, the first ejection nozzles 20a each have (i) six gas ejection openings 22a facing the central-axis portion of the container body 10 and spaced apart from each other by, for example, a central angle of 40 degrees and (ii) no gas ejection openings 22a across a central angle of 160 degrees on the side of the outer wall 10a as illustrated in (b) of FIG. 1. The first ejection nozzles 20a each have a mark at the center of the central angle of 160 degrees, that is, between a first central angle of 80 degrees and a second central angle of 80 degrees. With this arrangement, attaching a first ejection nozzle 20a to the distributor plate 11 in such a manner that the mark faces the outer wall 10a allows the first ejection nozzle 20a to be fixed with its gas ejection openings 22a facing the central-axis portion.

The second ejection nozzles 20b each have a plurality of gas ejection openings 22a in such a pattern as to allow hydrogen chloride gas to be ejected radially around the second ejection nozzle 20b. Specifically, the second ejection nozzles 20b each have eight gas ejection openings 22a spaced apart from each other by a central angle of 45 degrees as illustrated in (c) of FIG. 1. This configuration allows the second ejection nozzles 20b to each eject hydrogen chloride gas radially from a plurality of equally spaced positions.

The description below deals with why the ejection nozzles 20 are arranged as described above and the gas ejection openings 22a are present as described above.

First, if the first ejection nozzles 20a (which are adjacent to the outer wall 10a) had gas ejection openings 22a facing the outer wall 10a, the outer wall 10a would be subjected to collision of ejected hydrogen chloride gas and metallurgical grade silicon powder in an airflow. This would corrode or wear the outer wall 10a. In view of that, the fluidized-bed reaction vessel 1 as the present embodiment includes first ejection nozzles 20a each having not gas ejection openings 22a facing all directions but unequally spaced gas ejection openings 22a facing limited directions. Specifically, the first ejection nozzles 20a are each oriented in such a manner that a portion of the first ejection nozzle 20a which portion has no gas ejection opening 22a faces the outer wall 10a. This configuration can prevent the first ejection nozzles 20a from ejecting hydrogen chloride gas toward the outer wall 10a, and can thereby reduce corrosion and wear of the outer wall 10a.

The first ejection nozzles 20a (which are adjacent to the outer wall 10a) surround the plurality of second ejection nozzles 20b present inward. This arrangement can prevent the outer wall 10a from becoming directly subjected to hydrogen chloride gas ejected from the second ejection nozzles 20b (each of which allows hydrogen chloride gas to be ejected radially around the second ejection nozzle 20b).

That portion which has no gas ejection opening 22a preferably extends over an area defined by a central angle of larger than 90 degrees.

Second, the fluidized-bed reaction vessel 1 as the present embodiment is configured to cause metallurgical grade silicon powder and hydrogen chloride gas to react with each other for production of trichlorosilane. The fluidized-bed reaction vessel 1 is normally a vertically long reaction vessel. The fluidized-bed reaction vessel 1 is configured to cause the reaction by, for example, bringing hydrogen chloride gas flowing upward from a lower portion of the container body 10 into contact with metallurgical grade silicon powder falling from an upper portion of the container body 10. This causes (i) an upflow Fup of hydrogen chloride gas at the central-axis portion of the container body 10 and (ii) a downflow Fdown of hydrogen chloride gas as it has reached an upper portion of the container body 10 and falls down in the vicinity of the outer wall 10a of the container body 10 for circulation as illustrated in FIG. 2. This arrangement can increase the number of times of contact between metallurgical grade silicon powder and hydrogen chloride gas (that is, the area of the contact surface), thereby leading to an increased reaction efficiency.

Conventional ejection nozzles all allow hydrogen chloride gas to be ejected radially in all directions. Those peripheral ejection nozzles which are present in the vicinity of an outer wall surface also let hydrogen chloride gas be ejected toward the wall surface. Since those peripheral ejection nozzles let hydrogen chloride gas be ejected toward the outer wall surface, there is an upflow of hydrogen chloride gas in the vicinity of the outer wall surface. The upflow will counter an intended downflow in the vicinity of the outer wall surface, thereby disturbing circulation inside the container body.

In view of the above, the fluidized-bed reaction vessel 1 as the present embodiment includes a plurality of ejection nozzles 20 among which first ejection nozzles 20a (which are adjacent to the outer wall 10a of the container body 10) each have gas ejection openings 22a in such a pattern as to prevent hydrogen chloride gas from being ejected toward the outer wall 10a.

The above configuration prevents an upflow Fup in the vicinity of the outer wall 10a. This in turn allows metallurgical grade silicon powder and hydrogen chloride gas to circulate efficiently and come into contact with each other more times (that is, over a larger surface area), thereby increasing the reaction efficiency.

The fluidized-bed reaction vessel 1 as the present embodiment includes a plurality of ejection nozzles 20 among which second ejection nozzles 20b (which are present inward of the first ejection nozzles 20a) each have a plurality of gas ejection openings 22a in such a pattern as to allow hydrogen chloride gas to be ejected radially around the second ejection nozzle 20b. This allows an upflow Fup of hydrogen chloride gas to be caused at the central-axis portion of the container body 10.

The method according to the present embodiment for producing trichlorosilane includes causing metallurgical grade silicon powder and hydrogen chloride gas to react with each other with use of the fluidized-bed reaction vessel 1 as the present embodiment. This can provide a trichlorosilane producing method involving use of the fluidized-bed reaction vessel 1, which is capable of improving the efficiency of reaction between hydrogen chloride gas and metallurgical grade silicon powder.

An aspect of the present invention may be arranged such that the plurality of first ejection nozzles 20a do not completely surround the plurality of second ejection nozzles 20b. For instance, the plurality of first ejection nozzles 20a are simply present outward of the plurality of second ejection nozzles 20b (that is, on the side of the outer wall 10a). For instance, one or more of the second ejection nozzles 20b may be adjacent to the outer wall 10a.

The first ejection nozzles 20a and the second ejection nozzles 20b may each have not a double-pipe structure but a single-pipe structure including, for example, an upper-surface blocked outer pipe 22 but not including an inner pipe 21.

The present invention is not limited to the description of the embodiments above, but may be altered in various ways by a skilled person within the scope of the claims. The present invention encompasses, in its technical scope, any embodiment based on an appropriate combination of technical means disclosed in different embodiments.

As described above, a fluidized-bed reaction vessel as an aspect of the present invention is a fluidized-bed reaction vessel configured to cause metallurgical grade silicon powder and hydrogen chloride gas to react with each other for production of trichlorosilane, the fluidized-bed reaction vessel including: a container body having a bottom surface; and a plurality of ejection nozzles standing on the bottom surface, the ejection nozzles each having at least one gas ejection opening configured to allow the hydrogen chloride gas to be ejected sideways, the plurality of ejection nozzles including at least one first ejection nozzle adjacent to an outer wall of the container body, the at least one gas ejection opening of the at least one first ejection nozzle being configured to prevent the hydrogen chloride gas to be ejected toward the outer wall.

With the above configuration, the first ejection nozzle (which is adjacent to the outer wall) does not allow hydrogen chloride gas to be ejected toward the outer wall. The above configuration can thus provide a fluidized-bed reaction vessel capable of reducing corrosion and wear of the inner wall of the reaction vessel.

A fluidized-bed reaction vessel as an aspect of the present invention may preferably be arranged such that the plurality of ejection nozzles include at least one second ejection nozzle present inward of the at least one first ejection nozzle, and the at least one gas ejection opening of the at least one second ejection nozzle includes a plurality of gas ejection openings configured to allow the hydrogen chloride gas to be ejected radially around the at least one second ejection nozzle.

With the above configuration, the gas ejection openings of the second ejection nozzle allow hydrogen chloride gas to be ejected radially around the second ejection nozzle at the central-axis portion of the container body. This allows an upflow of hydrogen chloride gas to be caused at the central-axis portion of the container body.

A fluidized-bed reaction vessel as an aspect of the present invention may preferably be arranged such that the at least one second ejection nozzle includes a plurality of second ejection nozzles, the at least one first ejection nozzle includes a plurality of first ejection nozzles, and the plurality of second ejection nozzles are surrounded by the plurality of first ejection nozzles.

With the above configuration, the plurality of second ejection nozzles are surrounded by the plurality of first ejection nozzles present peripherally, and the plurality of first ejection nozzles each allow hydrogen chloride gas to be ejected inward. This allows an upflow of hydrogen chloride gas to be caused at the central-axis portion of the container body. Further, the first ejection nozzles (which are adjacent to the outer wall) do not cause an upflow in the vicinity of the outer wall surface. This allows metallurgical grade silicon powder and hydrogen chloride gas to circulate efficiently and come into contact with each other more times (that is, over a larger surface area), thereby increasing the reaction efficiency.

The above configuration can thus provide a fluidized-bed reaction vessel capable of improving the efficiency of reaction between metallurgical grade silicon powder and hydrogen chloride gas.

A fluidized-bed reaction vessel as an aspect of the present invention may preferably be arranged such that the plurality of ejection nozzles each include a double pipe including an upper-surface blocked outer pipe and an inner pipe, the inner pipe has an inner-pipe opening through which the hydrogen chloride gas is ejected into a space between the upper-surface blocked outer pipe and the inner pipe, the at least one gas ejection opening is present in the upper-surface blocked outer pipe at a position below the inner-pipe opening so as to allow the hydrogen chloride gas to be ejected in the container body, and an angle is formed by (i) a straight line connecting a lower end of the inner-pipe opening and an upper end of the at least one gas ejection opening with each other and (ii) a horizontal line, the angle being larger than a repose angle of the metallurgical grade silicon powder. The repose angle refers to the steepest angle of a descent of a particulate object such as metallurgical grade silicon powder at which piled metallurgical grade silicon powder will not slump spontaneously and will be stable.

With the above configuration, the ejection nozzles for an aspect of the present invention each have a double-pipe structure including an upper-surface blocked outer pipe and an inner pipe. A single-piped ejection nozzle may let metallurgical grade silicon powder enter the ejection nozzle directly. This may clog the ejection nozzle itself. In contrast, in a case where (i) the ejection nozzles each have a double pipe including an upper-surface blocked outer pipe and an inner pipe, and (ii) the upper-surface blocked outer pipe has a gas ejection opening lower in position than the inner-pipe opening, even in a case where metallurgical grade silicon powder has entered an ejection nozzle through a gas ejection opening of the upper-surface blocked outer pipe, the metallurgical grade silicon powder will be accumulated between the upper-surface blocked outer pipe and the inner pipe, and will not likely enter the inner pipe. The ejection nozzles are thus configured such that metallurgical grade silicon powder does not likely enter the main channel of an ejection nozzle to clog the ejection nozzle.

In particular, an aspect of the present invention is arranged such that an angle is formed by (i) a straight line connecting a lower end of the inner-pipe opening and an upper end of the at least one gas ejection opening in the upper-surface blocked outer pipe with each other and (ii) a horizontal line, the angle being larger than a repose angle of the metallurgical grade silicon powder. With the above configuration, even in a case where metallurgical grade silicon powder is accumulated between the upper-surface blocked outer pipe and the inner pipe, piled metallurgical grade silicon powder will not be taller than the inner-pipe openings, indicating that metallurgical grade silicon powder will not likely enter the ejection nozzle through an inner-pipe opening.

The above configuration can thereby prevent the ejection nozzles from becoming clogged.

A fluidized-bed reaction vessel as an aspect of the present invention may preferably be arranged such that the at least one gas ejection opening of each of the plurality of ejection nozzles is present at a height of not less than 15 mm and not more than 30 mm above the bottom surface of the container body.

Metallurgical grade silicon powder and hydrogen chloride gas are caused to react with each other for production of trichlorosilane through a reaction step, which leaves impurities accumulated at the bottom surface of the container body. While such impurities are removed regularly, the ejection nozzles need to be each configured such that the gas ejection opening of each ejection nozzle is not clogged by impurities before the regular removal.

In view of the above, an aspect of the present invention is arranged such that the at least one gas ejection opening of each of the plurality of ejection nozzles is present at a height of not less than 15 mm and not more than 30 mm above the bottom surface of the container body. This can prevent the gas ejection opening of each ejection nozzle from becoming clogged by impurities.

A method as an aspect of the present invention for producing trichlorosilane includes causing metallurgical grade silicon powder and hydrogen chloride gas to react with each other with use of the fluidized-bed reaction vessel.

The above method can provide a method for producing trichlorosilane which method involves use of a fluidized-bed reaction vessel capable of reducing corrosion and wear of the inner wall of the reaction vessel.

REFERENCE SIGNS LIST

1 Fluidized-bed reaction vessel
10 Container body
10a Outer wall
11 Distributor plate (bottom surface)
12 Heat transfer medium pipe
12a Vertical pipe
13 Gas feed opening
14 Outlet
20 Ejection nozzle
20a First ejection nozzle (ejection nozzle)
20b Second ejection nozzle (ejection nozzle)
21 Inner pipe
21a Inner-pipe opening
22 Upper-surface blocked outer pipe
22a Gas ejection opening
α Repose angle
θ Angle

The invention claimed is:

1. A fluidized-bed reaction vessel configured to cause metallurgical grade silicon powder and hydrogen chloride gas to react with each other for production of trichlorosilane, the fluidized-bed reaction vessel comprising:
a container body having a bottom surface; and
a plurality of ejection nozzles standing on the bottom surface,
the ejection nozzles each having at least one gas ejection opening configured to allow the hydrogen chloride gas to be ejected sideways,
the plurality of ejection nozzles including at least one first ejection nozzle adjacent to an outer wall of the container body, the at least one gas ejection opening of the at least one first ejection nozzle being configured to prevent the hydrogen chloride gas to be ejected toward the outer wall.

2. The fluidized-bed reaction vessel according to claim 1, wherein
the plurality of ejection nozzles include at least one second ejection nozzle present inward of the at least one first ejection nozzle, and
the at least one gas ejection opening of the at least one second ejection nozzle includes a plurality of gas ejection openings configured to allow the hydrogen chloride gas to be ejected radially around the at least one second ejection nozzle.

3. The fluidized-bed reaction vessel according to claim 2, wherein
the at least one second ejection nozzle includes a plurality of second ejection nozzles,
the at least one first ejection nozzle includes a plurality of first ejection nozzles, and
the plurality of second ejection nozzles are surrounded by the plurality of first ejection nozzles.

4. The fluidized-bed reaction vessel according to any claim 1, wherein
the plurality of ejection nozzles each include a double pipe including an upper-surface blocked outer pipe and an inner pipe,
the inner pipe has an inner-pipe opening through which the hydrogen chloride gas is ejected into a space between the upper-surface blocked outer pipe and the inner pipe,
the at least one gas ejection opening is present in the upper-surface blocked outer pipe at a position below the inner-pipe opening so as to allow the hydrogen chloride gas to be ejected in the container body, and
an angle is formed by (i) a straight line connecting a lower end of the inner-pipe opening and an upper end of the at least one gas ejection opening with each other and (ii) a horizontal line, the angle being larger than a repose angle of the metallurgical grade silicon powder.

5. The fluidized-bed reaction vessel according to claim 1, wherein
the at least one gas ejection opening of each of the plurality of ejection nozzles is present at a height of not less than 15 mm and not more than 30 mm above the bottom surface of the container body.

6. A method for producing trichlorosilane, the method comprising:
causing metallurgical grade silicon powder and hydrogen chloride gas to react with each other with use of a fluidized-bed reaction vessel according to claim 1.

* * * * *

UNITED STATES PATENT AND TRADEMARK OFFICE
CERTIFICATE OF CORRECTION

| | | |
|---|---|---|
| PATENT NO. | : 11,071,961 B2 | Page 1 of 1 |
| APPLICATION NO. | : 16/765074 | |
| DATED | : July 27, 2021 | |
| INVENTOR(S) | : Kenji Hirota and Katsuya Ogihara | |

It is certified that error appears in the above-identified patent and that said Letters Patent is hereby corrected as shown below:

On the Title Page

Item (73), reads:
Assignee: TOKUYAMA CORPORATION,
Yamayuchi (JP)

Whereas it should read:
Assignee: TOKUYAMA CORPORATION,
Yamaguchi (JP)

Signed and Sealed this
Twenty-fourth Day of January, 2023

Katherine Kelly Vidal
*Director of the United States Patent and Trademark Office*